United States Patent [19]

Mullersman et al.

[11] 4,379,816
[45] Apr. 12, 1983

[54] INDICATOR OF FULL CHARGE FOR SECONDARY CELL OR BATTERY THEREOF

[75] Inventors: Ferdinand H. Mullersman, Gainesville, Fla.; Charles R. Blake, North Redondo Beach, Calif.

[73] Assignee: General Electric Company, Gainesville, Fla.

[21] Appl. No.: 313,312

[22] Filed: Oct. 20, 1981

Related U.S. Application Data

[63] Continuation of Ser. No. 189,337, Sep. 22, 1980.

[51] Int. Cl.³ .................................... H01M 10/48
[52] U.S. Cl. ................................ 429/91; 320/48
[58] Field of Search .............. 429/91, 90; 320/43, 320/48

[56] References Cited

U.S. PATENT DOCUMENTS

| | | | |
|---|---|---|---|
| 2,980,754 | 4/1961 | Reilly et al. | 429/91 |
| 3,445,291 | 5/1969 | Stein | 429/90 |
| 3,977,908 | 8/1976 | Kitai | 429/91 |

FOREIGN PATENT DOCUMENTS 1437752 6/1976 United Kingdom .

*Primary Examiner*—Charles F. LeFevour
*Attorney, Agent, or Firm*—Henry J. Policinski

[57] ABSTRACT

An indicator of full charge for secondary sealed cells and like cells which become heated when subjected to overcharge current, or batteries of such cells, undergoing a charging operation includes a heat sensitive mechanism adapted to change a perceivable characteristic in response to the rise in temperature of the cell or battery as the charging operation continues beyond full charge. Part of the heat sensitive mechanism is thermally coupled to the battery or cell and another part is maintained at ambient temperature so that the perceivable characteristic of the portion maintained at ambient temperature and that of the portion at the raised temperature of the overcharged battery or cell can be readily observed to signify that full charge has been attained. As preferably embodied, the heat sensitive mechanism is a liquid crystal material.

6 Claims, 10 Drawing Figures

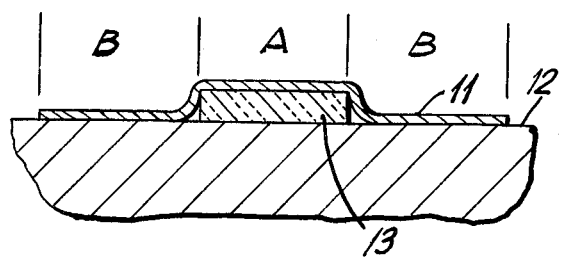
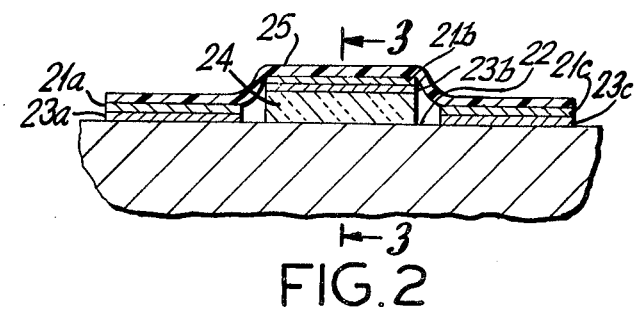
FIG.1    FIG.2
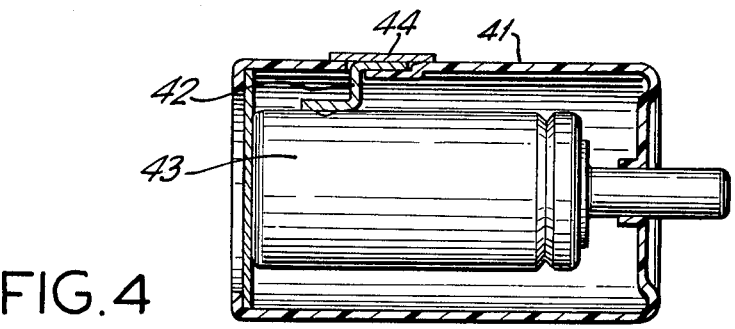
FIG.4
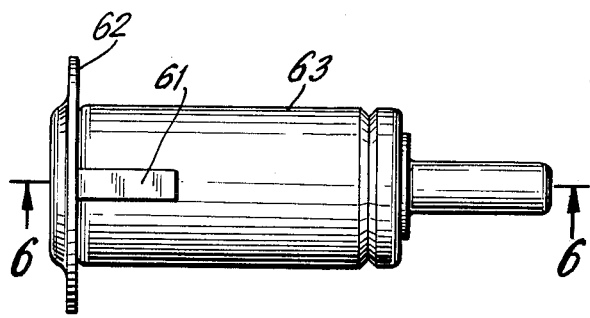
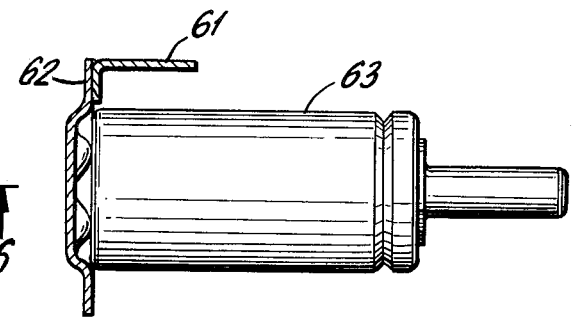
FIG.5    FIG.6
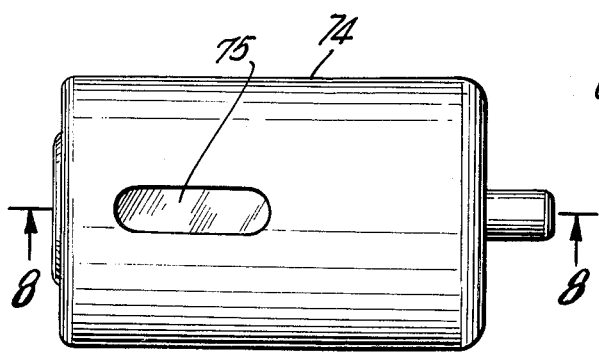
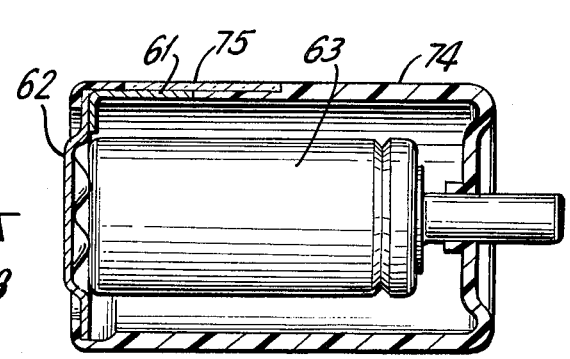
FIG.7    FIG.8

INDICATOR OF FULL CHARGE FOR SECONDARY CELL OR BATTERY THEREOF

This is a continuation, of application Ser. No. 189,337 filed Sept. 22, 1980.

BACKGROUND OF THE INVENTION

This invention relates generally to indicating devices for indicating a change in a predetermined parameter, and more particularly to heat sensitive indicators for indicating, in a charging operation, that a secondary cell, or battery of secondary cells, has reached full charge.

After full charge is achieved and charging continues beyond the full charge point, it has been observed that in certain cells there results a rise in temperature of the fully-charged battery or cell. In the present invention, this rise in temperature is employed to provide the desired full charge indication by virtue of a relative change in a perceivable parameter of the heat sensitive indicator.

Thus, the indicator according to the present invention is operable with secondary cells, notably sealed cells, which become heated when, after being fully charged, they are subjected to further charging current. Therefore, as used hereinafter, the term "cell or battery" shall refer to sealed cells or like cells which are so heated.

Indicating devices for indicating that a battery or cell has reached full charge in a charging operation are highly useful, since without such indicators it is often difficult to ascertain in simple fashion whether and when a battery or cell has reached full charge. This is particularly true of nickel-cadmium cells because there is no ready way to determine state-of-charge such as, for example, by measuring open circuit voltage as can be used for measuring the charge in lead-acid cells. Therefore, it may be necessary to test or measure the cell charge to ensure that full charge has been achieved. Thus, without the indicating device of the present invention, much effort and electrical energy may be wasted either in measuring the actual charge level of the battery, or in permitting the battery or cell to remain in the charging operation for a time longer than the minimum necessary to fully charge that particular cell.

Accordingly, it is an object of this invention to provide an indicating device for indicating that a cell or battery thereof has reached full charge in a charging operation.

It is also an object of this invention to provide an indicating device for indicating which rechargeable cells have reached full charge in a battery charger.

It is a further object of this invention to provide an indicating device which is relatively lightweight, easily readable, and relatively inexpensive to manufacture.

It is a still further object of this invention to provide an indicating device which may be affixed either to the battery or cell itself, or may be attached to other structures.

Objects and advantages of the invention are set forth in part above and in part below. In addition, these and other objects and advantages of the invention will become apparent herefrom or may be appreciated by practice with the invention, the same being realized and attained by the instrumentalities, combinations, and methodologies pointed out in the appended claims. Accordingly, the invention resides in the novel parts, arrangements, combinations, steps, methods, and improvements herein shown and described.

SUMMARY OF THE INVENTION

Briefly described, the present invention includes heat sensitive means adapted to display a change in some perceivable characteristic when subjected to a change in temperature, a first element of the heat sensitive means being thermally coupled to the cell or battery to be charged and a second element of the heat sensitive means being thermally isolated from the cell or battery. Advantageously, the two elements of the heat sensitive means are located as close together as possible and, preferably, are two portions of the same structure to ensure ease of use and uniformity in the perceivable characteristic. As preferably embodied, the heat sensitive means comprises a liquid crystal material adapted to undergo a change in color when subjected to a change in temperature.

According to one embodiment of the invention, a strip of liquid crystal material is applied directly to the battery or cell, with one portion of the strip in direct contact with the battery or cell and a second portion thermally insulated from the cell, such as by a piece of insulative material located between the liquid crystal strip and the battery or cell. Alternatively, the first portion of the liquid crystal strip is attached to a thermally conductive structure which, in turn, is attached directly to the battery or cell and the second portion is attached to, or simply held adjacent, a thermally insulative member such as a casing surrounding the battery or cell.

In another embodiment, a piece of liquid crystal is applied directly to the battery or cell and a second piece is applied to a nearby structure such as the battery charger itself.

It will be found that the objects and advantages of the invention, specifically enumerated herein, are achieved by the invention as here embodied.

At moderate charge rates (approximately c/10), it has been observed that the temperature of sealed secondary cells or batteries in a charging operation does not generally rise above ambient temperature until the battery becomes fully charged. After the battery or cell reaches full charge, further charging (i.e., overcharging) will result in the generation of heat, and the temperature of the battery or cell will rise above its ambient level in order to dissipate that heat. Thus, by utilizing the capability of liquid crystal material to change color as its temperature changes, a reliable and inexpensive indication of full charge can be obtained by observing the color change in said liquid crystal material.

In the present invention, full charge indication can be achieved by comparing the color of the first segment with that of the second segment. When the cell is not yet fully charged, both of these areas will be the same color, corresponding to the ambient temperature. When the fully charged cell has continued on charge long enough to rise in temperature, the two areas of the liquid crystal material will differ in color. Thus, a color variation will exist between the insulated and noninsulated areas of the liquid crystal material, thereby providing a steady-state indication that the battery cell is in overcharge.

The existence of a temperature rise in a fully charged battery is particularly associated with sealed nickel-cadmium batteries for consumer use, because the simple constant current chargers typically used with those cells continue to deliver the same electrical power input even when the battery has become fully charged. While this overcharging is not harmful, it is plainly wasteful of electrical energy and the present invention is intended to help avoid such waste.

The indicator according to the present invention permits detection of the earliest time when the cell or battery is completely charged so that the cell or battery can resume service after a minimum charge time. Thus, a user does not have to charge the partially discharged cell or battery for the full time required to bring a completely discharged cell to full charge, as often has been the practice.

It will also be found that the present invention enables the detection of full charge without the need for expensive detection instruments and thus provides a simple and inexpensive solution to this problem, a solution of sufficiently low cost to be usable in consumer products.

It will be further found that the indicator of the present invention provides indication of the attainment of full charge without drawing current from the charging circuitry or the battery or cell being charged, without requiring removal of the battery or cell from the charging apparatus for testing and without a waiting period to achieve a stable open circuit voltage in order to determine state of charge.

It will be understood that the foregoing general description as well as the following detailed description are explanatory of the invention and are not intended to be restrictive thereof. Accordingly, the accompanying drawings, referred to herein and forming a part hereof, illustrate preferred embodiments of the invention and, together with the description, serve to explain the principles of the invention.

BRIEF DESCRIPTION OF THE DRAWINGS

FIG. 1 is an expanded partial sectional view of the surface of a battery or cell having an indicator device in accordance with one embodiment of the present invention.

FIG. 2 is an expanded partial sectional view of the surface of a battery or cell having an indicator device in accordance with another embodiment of the present invention.

FIG. 4 is a sectional view of a cylindrical battery or cell having an indicator device in accordance with a modified embodiment of the present invention.

FIG. 5 is a plan view of a cell adapted for an indicator device in accordance with a further modified embodiment of the present invention.

FIG. 6 is a sectional view taken along section 6—6 of FIG. 5.

FIG. 7 is a plan view of the cell of FIG. 5, having a plastic shell mounted thereover.

FIG. 8 is a sectional view taken along section 8—8 of FIG. 7.

DETAILED DESCRIPTION OF PREFERRED EMBODIMENTS

Figure 3:
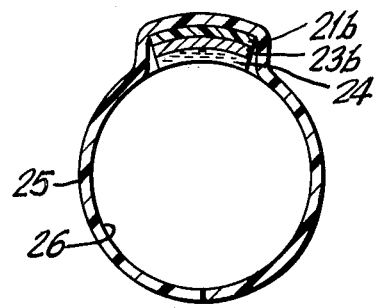
FIG. 3 is an expanded sectional view taken essentially along section 3—3 of FIG. 2.

An indicator according to the present invention is simply illustrated in FIG. 1. A liquid crystal film composite 11 is thermally coupled to surface 12 of the cell or battery (i.e., as indicated above, a sealed or like cell which undergoes a rise in temperature after reaching full charge and charging current continues to be applied). Thermal insulating material 13 is placed between area A of film 11 and surface 12 to thermally decouple (or insulate) area A from the battery surface.

During the charging operation (which can be carried out in the usual way) and prior to the attainment of full charge, all of liquid crystal film composite 11 remains one color since the battery or cell remains essentially at ambient temperature. However, once full charge is reached, the application of further charging current (overcharge current) results in the production of heat, which raises the temperature of the charged cell. As a result, outer areas B of liquid crystal film composite 11, which are thermally coupled to cell surface 12, experience a rise in temperature, while area A of film composite 11, which is insulated from the temperature rise by thermal insulating material 13, remains substantially at ambient temperature. A color differential is thereby produced between area A of film composite 11 and the two outer areas B, which color differential is indicative of the attainment of full charge.

In practice, the cell may begin to experience a small rise in temperature a very short time before full charge is actually attained. The indicator will, therefore, display a slight change in color (in areas B) relative to the ambient temperature color (in area A). However, the color of area B will continue to change until the full charge state is reached due to continuing rise in cell temperature. After full charge is reached, the cell temperature will reach a somewhat constant elevated temperature assuming ambient temperature remains constant, and areas B of the indicator will show a generally steady color, thereby indicating full charge has been reached and the cell is being overcharged. In addition, the color difference between areas A and B will be much more pronounced at full charge than at the onset of premature temperature rise.

The liquid crystal material used to make film composite 11 may be a microencapsulated cholesteric liquid crystal material such as is commercially available from Djinnii Industries of Dayton, Ohio. The film composite may be formed by conventional techniques, adhering the liquid crystal material to a transparent substrate, such as a clear polyester sold under the name "MYLAR" by E. I. duPont de Nemours, with a black background layer adhered behind the liquid crystal material. The black background material may be any suitable material known to interact optically with the liquid crystal material for permitting the desired color change to be visible. An adhesive layer may be applied behind the black background layer, and can be any suitable adhesive material or may be a double-sided adhesive tape. Alternatively, the liquid crystal material may be deposited on the black background layer, and then covered with a transparent protective overlay.

The color of light reflected from the liquid crystal film composite 11 is a function of temperature. The film composite is preferably capable of operating over an ambient temperature range of about 50° F. or lower to at least 95° F., and is thus operable under most end-use conditions. The liquid crystal material visibly responds relatively rapidly to a rise in cell temperature. For a rise of as little as about 5 Farenheit degrees, the liquid crystal indicator of the invention responds in a matter of a few seconds.

Thermal insulating material 13 may be any suitable insulator of very low thermal conductivity, such as polystyrene foam. Of course, the insulation layer should be kept as thin as possible to avoid an undesirable protrusion on the battery or cell.

In order to ensure that the liquid crystal indicator of the invention provides an appreciable change in color per unit change in temperature, so that a given difference between the cell temperature and ambient temperature will give rise to the greatest possible color differential, it is desirable to minimize the sheet thermal conductivity of the film composite in the area A of FIG. 1. Removing the adhesive from the black background layer in that area contributes to reducing the sheet conductivity. Furthermore, the conductivity of the black background layer should be minimized. Also, advantageously, the transparent protective layer should be as thin as possible and of a material having very minimal thermal conductivity.

FIG. 2 provides a more detailed illustration of an indicator according to the present invention, comprising liquid crystal material segments 21a, 21b, and 21c, which are adhered to, and separated from cell surface 22 by, respective black background layer segments 23a, 23b, and 23c. Thermal insulating material 24 is interposed between cell surface 22 and black background layer segment 23b. Transparent protective overlay 25 spans the liquid crystal-black background-insulation assembly, and can be utilized to affix the assembly to the cell surface by overlapping the overlay beyond the borders or the underlying layers and affixing the overlay to the battery or cell by suitable adhesives. The indicator of FIG. 2 operates in the same manner as that of FIG. 1.

FIG. 3 illustrates the use of the overlapping transparent protective overlay 25 to hold the liquid crystal material segment 21b, black background layer segment 23b, and thermal insulating material 24 of FIG. 2 to the surface 26 of a standard AA-size cell. Because an AA-size cell is depicted, the overlay is wrapped around nearly the entire circumference of the cell because a smaller segment of the overlay—for example, MYLAR—may resist being held on the one-half inch diameter cell. It will, of course, be understood that the present invention is not limited in application to cells or batteries of any particular size or configuration.

A further indicator device according to the present invention is shown in FIG. 4, as applied to a D-size nickel-cadmium cell of the type being marketed for consumer use. In C- and D-size nickel-cadmium rechargeable cells of this type, the lateral surface of the cell itself is not exposed. Because of the cost of materials, the actual cell size may be smaller than the usual consumer C- and D-size dry cells. Therefore, the cell is covered by a plastic facade or shell which enlarges the dimensions of the cell to that of the familiar C- or D-size dry cells.

Accordingly, in the embodiment of FIG. 4, the indicator of the present invention is adapted to include a formed metal tab 42 which is seated in a slotted recess of plastic shell 41, one end of said metal tab 42 being thermally coupled to the surface of cell 43, and the other end, which lies in the curved plane of the outer shell 41, being thermally coupled to the central portion of liquid crystal film composite 44. The outer portions of said liquid crystal film composite 44 are attached to plastic shell 41 which, being of low thermal conductivity, insulates those portions of liquid crystal film composite 44 from the effects of a rise in temperature of cell 43 during overcharging. Thus it will be seen that in the device of FIG. 4, the indicator operates just as in the previously described embodiments to provide a color differential indicative of the attainment of full charge. The central portion of liquid crystal film composite 44 changes color as the temperature of cell 43 rises during overcharging, while the outer regions of said liquid crystal film composite remain at a different color and essentially at ambient temperature.

FIGS. 5 through 8 illustrate a still further embodiment of the present invention. As shown in FIGS. 5 and 6, an L-shaped metal tab 61, made of steel, for example, is attached, e.g., by soldering, to steel disk 62 which is welded to the negative terminal of a D-size nickel-cadmium cell 63. Tab 61 could be provided by forming the disk with an integral tab-like projection and bending the projection 90°. Thus, when the cell is being overcharged, the temperature of metal tab 61 will rise in correspondence with the rise in temperature of cell 63 because of the thermal coupling.

FIG. 7 depicts the machined outer plastic shell 74 mounted over cell 63 of FIG. 6, said shell having an oval-shaped liquid crystal film composite 75 placed in a machined recess of said shell 74.

As can more readily be seen in FIG. 8, approximately one-half of the recess in shell 74, i.e., that shown to the left in FIG. 8, extends through the shell thickness, while the right-most portion of the recess extends approximately half-way through the shell. Thereby, metal tab 61 extends longitudinally into part of the recess, and its end is positioned underneath, and in thermal contact with, the left-most half of liquid crystal film composite 75. The right-most half of film composite 75 is attached to plastic shell 74, which, being of thermally insulating material, insulates the right portion of the film composite from the cell so that it remains essentially at ambient temperature during overcharging of cell 63.

The top surface of liquid crystal film composite 75 may be positioned slightly below the surface of plastic shell 74, so that shrink tubing can be shrunk over the resulting consumer D cell without the tubing touching the liquid crystal film composite. This will avoid an unnecessary thermally conductive path between the two halves of the film. Advantageously, two or more indicators may be located at various positions on the shell so that the orientation of the cell in the charger will not be critical to observation of the indicator.

Figures 9, 10:
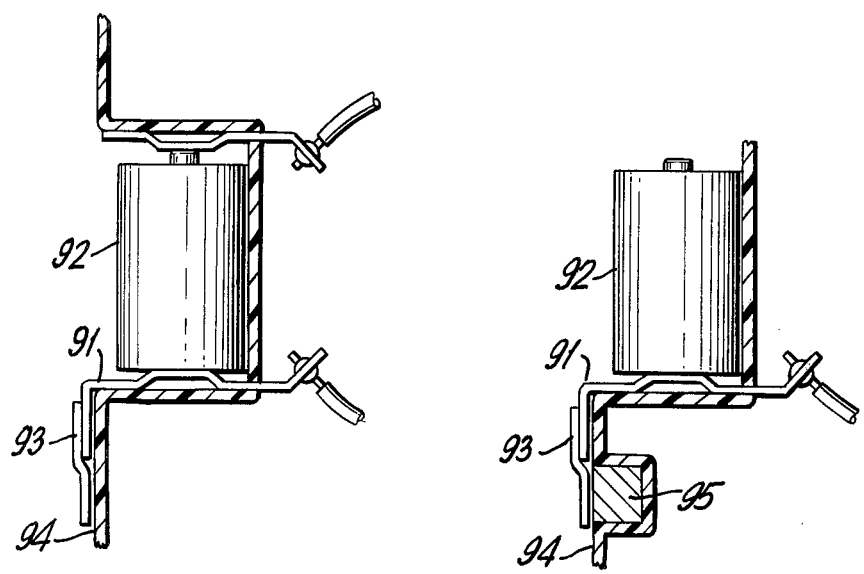
FIG. 9 is a schematic illustration of showing how the indicator device according to the present invention can be applied directly to a battery charging apparatus.
FIG. 10 is a schematic illustration of an alternate application to FIG. 9.

In the embodiments of FIGS. 1 through 8, the liquid crystal film composite is shown affixed directly to the battery or cell itself, so that each battery or cell may carry its own full charge indicator. The present invention can also be adapted so as to eliminate the need for individual full charge indicators on each battery or cell. Thus, as schematically depicted in FIG. 9, full charge indicator devices may be affixed directly to the battery charger unit at each charging position. The indicators are preferably located adjacent each charger contact having the greatest area of contact with the battery to be charged at that charging position.

An advantage of this approach over individual full charge indicators on each battery includes elimination of the need to orient a cell in order to bring its full charge indicator into view. Moreover, through this approach, the physical dimensions or appearance of the battery or cell would not be affected.

In operation, as shown in FIG. 9, charger terminal 91 (which contacts battery 92 over a larger area than the opposite terminal) is heated by heat conducted from the fully charged cell 92 which is subjected to an overcharge current. By thermally coupling a portion of a strip of liquid crystal film composite 93 to this charging terminal, (for instance via an appropriately formed metal tab such as those depicted in FIGS. 5 and 6), and by coupling a second portion of the liquid crystal strip to the charger case 94 (made of a low thermally conductive material) or to some other body that remains at or near ambient temperature, an indication of full charge for that particular cell is readily observable on the liquid crystal composite strip in accordance with the present invention. Accordingly, each charger contact should be well isolated thermally so as not to act as a heat sink to an unacceptable degree, so that the liquid crystal strip is subjected to a maximum temperature differential. Furthermore, the charging terminals in adjacent cell positions should also be thermally isolated from each other to prevent the heat generated by a cell being overcharged in one position from causing a false indication in an adjacent position.

A problem that may arise in employing the full charge indicator of the present invention concerns a possible indication error as the result of ambient temperature cycling caused by the on-off control nature of air-conditioners and heaters. In particular, the thermal time constant of nickel-cadmium cells is relatively large, whereas the thermal time constant of the ambient-sensing portion of the indicator according to the present invention will tend to be smaller than that of the battery or cell. Thus a nickel-cadmium cell which has not yet reached full charge will have an average temperature equal to the average ambient temperature, with only small excursions from that average.

The temperature of the portion of the liquid crystal film composite not thermally coupled to the battery will tend to more rapidly and closely follow the fluctuations in the ambient temperature. Thus, as the ambient periodically shifts above and below its average temperature, the liquid crystal film section couled to the ambient may instantaneously have a different temperature and thus a different color than that of the liquid crystal film composite section coupled to the cell. Therefore, to the observer, a cell that has not become fully charged may nonetheless appear to be fully charged, when viewed at a particular time, due to the color differential displayed over the total area of the liquid crystal film composite.

This problem may be overcome by thermally coupling the ambient temperature-sensing portion of the liquid crystal film composite to a body having a relationship of specific heat, density and thermal coupling to the ambient which gives it a thermal time constant approximately equal to that of the nickel-cadmium cell, or other secondary cell, of concern. As shown in FIG. 10, such body (indicated at 95) may, for example, be a piece of metal and should be essentially thermally isolated from the cell, such as by mounting it in the plastic of the charger case. In this way, the ambient-sensing portion of the liquid crystal film composite experiences only small cyclic excursions in temperature, and any such excursions can be made to be of essentially the same magnitude and phase as those of the cell which is being charged. A color differential on the liquid crystal film composite will then exist only when the cell becomes heated as a result of overcharging, and thus would provide a true full charge indication. The inventive features disclosed with reference to FIGS. 9 and 10 are claimed in co-pending application Ser. No. 180,196, filed Aug. 22, 1980 which is assigned to the same assignee as the present application.

It will be readily appreciated by those skilled in the art that the present invention in its broader aspects is not limited to the specific embodiments herein shown and described. For example, heat sensitive means other than liquid crystal material may be used as the indicator so long as a change in some perceivable characteristic of the heat sensitive means occurs with a change in temperature. Accordingly, variations may be made from the embodiments described herein which are within the scope of the accompanying claims, without departing from the principles of the invention and without sacrificing its chief advantages.

What is claimed is:

1. A full charge indicator for secondary sealed cells and the like, or battery thereof, for indicating attainment of full charge during a charging operation, comprising heat sensitive means adapted to display a change in some perceivable characteristic when subjected to heat, a first element of said heat sensitive means being thermally coupled to the battery or cell so that said element is maintained at substantially the same temperature as the battery or cell, and a second element of said heat sensitive means being thermally isolated from the battery or cell so that it remains substantially at ambient temperature, such that once the battery or cell has reached essentially full charge, further charging causes said first element to undergo a change in said perceivable characteristic as a result of the change in temperature of the battery or cell, while the second element substantially does not undergo a change in said characterisitic, the relative difference in the perceivable characteristic of the two elements being observable.

2. A full charge indicator according to claim 1, wherein each element of said heat sensitive means includes a liquid crystal material adapted to undergo a change in color when subjected to a change in temperature.

3. A full charge indicator according to claim 2, wherein said liquid crystal material is adhered to a black background layer and covered by a transparent protective overlay to form a liquid crystal film composite.

4. A full charge indicator according to claim 3, wherein said first element and said second element of the heat sensitive means are formed integrally on adjacent portions of a single strip of liquid crystal film composite.

5. A full charge indicator according to claims 1, 2, 3 or 4, wherein said heat sensitive means is affixed to the battery or cell.

6. A full charge indicator according to claims 1, 2 or 3, wherein said charging operation is being effected in a battery charger unit, and wherein said first element of the heat sensitive means is affixed to the battery or cell, and said second element is affixed to the battery charger unit.

* * * * *